US012592949B2

(12) United States Patent
Datla et al.

(10) Patent No.: US 12,592,949 B2
(45) Date of Patent: Mar. 31, 2026

(54) METHODS AND SYSTEMS FOR CATEGORIZING CYBER INCIDENT LOGS FEATURING DYNAMIC RELATIONSHIPS TO PRE-EXISTING CYBER INCIDENT REPORTS IN REAL-TIME

(71) Applicant: Capital One Services, LLC, McLean, VA (US)

(72) Inventors: Vivek Datla, McLean, VA (US); Isha Chaturvedi, Mountain View, CA (US); Anirban Das, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 350 days.

(21) Appl. No.: 18/494,850

(22) Filed: Oct. 26, 2023

(65) Prior Publication Data

US 2025/0141895 A1 May 1, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 11,606,379 B1 * | 3/2023 | Pratt | ................... | H04L 63/1416 |
| 11,627,162 B2 * | 4/2023 | Brurok | .................... | H04L 63/20 726/3 |
| 2023/0117120 A1 * | 4/2023 | Johnson | ................ | G06F 21/552 726/22 |

* cited by examiner

*Primary Examiner* — Nicholas P Celani
(74) *Attorney, Agent, or Firm* — Foley & Lardner LLP

(57) ABSTRACT
Systems and methods for the creation of human-readable cyber incident reports from cyber incident logs, in which the cyber incident reports may link cyber incidents recorded in a cyber incident log to the existing knowledge sources. To do so, the systems and methods overcome the technical problems of conventional systems as well as the technical problems inherent in adapting artificial intelligence solutions to the creation of cyber incident reports.

20 Claims, 6 Drawing Sheets

Current Document Store

Document

Updated Document Store

Document

400

Receive a cyber incident log

402

Determine a log section

404

Parse the log section for a cyber incident characteristic and mapping data

406

Generate a cyber incident log map

408

Generate a feature input

410

Input the feature input into a model

412

Generate a cyber incident report

414

METHODS AND SYSTEMS FOR CATEGORIZING CYBER INCIDENT LOGS FEATURING DYNAMIC RELATIONSHIPS TO PRE-EXISTING CYBER INCIDENT REPORTS IN REAL-TIME

BACKGROUND

Cyber incidents refer to events or occurrences (referred to herein as "cyber incidents") that involve the unauthorized access, disruption, misuse, or theft of information technology (IT) systems, networks, or data. These incidents can cause harm to individuals, organizations, or even governments. Cyber incidents can take various forms, and some common examples of cyber incident types include data breaches (e.g., unauthorized individuals or entities gain access to sensitive or confidential information, such as personal data, financial records, or intellectual property), ransomware attacks (e.g., malicious software is deployed to encrypt files or lock users out of their systems, with cyber-criminals demanding a ransom for the decryption key), phishing attacks (e.g., cybercriminals use deceptive emails, messages, or websites to trick individuals into revealing sensitive information, such as login credentials or financial details), Denial of Service (DoS) and Distributed Denial of Service (DDoS) attacks (e.g., attackers overwhelm a target's servers or network infrastructure with excessive traffic, causing services to become unavailable), malware infections (e.g., malicious software, such as viruses, worms, Trojans, and spyware, infects computers or networks, allowing unauthorized access or control), insider threats (e.g., employees or trusted individuals within an organization intentionally or accidentally compromise data or systems), hacking (e.g., unauthorized individuals exploit vulnerabilities in systems or networks to gain unauthorized access or control), social engineering (e.g., cyber attackers manipulate individuals into revealing sensitive information or performing certain actions through psychological manipulation), Internet of Things (IoT) vulnerabilities (e.g., insecure IoT devices can be compromised, leading to unauthorized access to networks or data), website defacements (e.g., cyber attackers alter the content of a website, often for political or ideological reasons), identity theft (e.g., personal information is stolen and used to impersonate individuals, commit fraud, or access sensitive resources), cyber espionage (e.g., state-sponsored or well-funded attackers infiltrate computer systems to gather sensitive information or conduct surveillance), and/or other types of attacks to cybersecurity.

In response to a cyber incident, modern systems create cyber incident reports that comprise human-readable content that may reference existing reference content (e.g., presentations, documents, confluence pages, etc.). However, the creation of individual cyber incident reports is both expensive and time-consuming. Moreover, cyber incident reports often require translation of information, reformatting of computer-generated content into a format digestible by human users, and/or a level of technical depth that makes the automation of cyber incident reports difficult.

In recent years, the use of artificial intelligence, including, but not limited to, machine learning, deep learning, etc. (referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is of high quality can be complex and time-consuming. Second, data that is obtained may need to be categorized and labeled accurately, which can be a difficult, time-consuming task that may need to be performed manually. These technical challenges may present an inherent problem with attempting to use an artificial intelligence-based solution to create cyber incident reports.

SUMMARY

Systems and methods are described herein for the creation of human-readable cyber incident reports from cyber incident logs, in which the cyber incident reports may link cyber incidents recorded in a cyber incident log to the existing knowledge sources. To do so, the systems and methods overcome the technical problems of conventional systems as well as the technical problems inherent in adapting artificial intelligence solutions to the creation of cyber incident reports.

In conventional systems, cyber incident reports are manually generated by subject matter experts to summarize cyber incident logs. Due to the large volume of cyber incident logs, and the human effort needed to create cyber incident reports, relatively few cyber incident reports are generated compared to the volume of the cyber incident logs. This creates an initial hurdle to the application of artificial intelligence solutions to the creation of cyber incident reports as there is little training data available for the various types of cyber incident logs, and what data is available may be biased based on the small sample size.

Additionally, the training data that is available may relate to different types of cyber incident logs as well as cyber incident logs that are generated by different subject matter experts (e.g., creating a lack of standardization). This raises risk in understanding the correlations and commonality across the disparate cyber incidents, which seem unrelated. To further exacerbate the issues with lack of standardization in cyber incident reports, cyber incident logs—and the cyber incidents upon which they are generated—rapidly change as new formats are used and new cyber incident types are categorized. This means not only that there is no training data for new cyber incident types, but also that as previously generated cyber incident reports are not updated for any changes in formatting and/or terminology, the previously generated cyber incident reports become ill-suited as training data.

To overcome these technical problems, the systems and methods create cyber incident log maps that include both static data (e.g., data that is not dependent on the cyber incident log in which it is featured) and dynamic data (e.g., data that is dependent on the cyber incident log in which it is featured). For example, upon receiving a cyber incident log, the system determines static data, such as one or more cyber incident characteristics (e.g., keywords, digital fingerprints, attack vectors, etc. corresponding to a specific cyber incident type), as well as dynamic data (e.g., an arrangement of sections, headings, cross-references, etc. in the cyber incident log).

The system then uses the cyber incident log map to mitigate the technical issues related to adapting artificial intelligence solutions to the creation of cyber incident reports by relying on a mixture of static and dynamic data in the cyber incident log map. For example, the cyber incident log map acts as a dynamic index to reflect historical as well as recent updates. For example, the static data may reflect existing terminology and relationships to previous cyber incident reports, while the dynamic data is constantly refreshed with outdated links, references, formats, etc. being migrated out (e.g., purged) over time.

Moreover, the cyber incident log map (and, in particular, the dynamic data therein) provides additional technical benefits of allowing multiple types of cyber incident reports (whether standardized or not) to be used. For example, the cyber incident log map directs the system to parse different areas of a cyber incident log for different types of information as different cyber incident logs may record different data in different places (e.g., as formatting changes over time and/or as different cyber incident log creators create different cyber incident logs).

In some aspects, systems and methods for categorizing cyber incident logs featuring dynamic relationships to pre-existing cyber incident reports in real-time are described. For example, the system may receive a cyber incident log for display, in a user interface of a user device, to a user, wherein the cyber incident log includes a plurality of log sections. The system may determine a log section of the plurality of log sections that has a log section characteristic, wherein the log section characteristic is indicative of the log section comprising one or more cyber incident characteristics. The system may parse the log section for a cyber incident characteristic and mapping data, wherein the mapping data describes a relationship of the log section to the plurality of log sections. The system may generate a cyber incident log map for the log section based on the mapping data. The system may generate a feature input based on the cyber incident log map and the cyber incident characteristic. The system may input the feature input into a model, wherein the model is trained to determine similarities between one or more of a plurality of cyber incident reports and inputted feature inputs. The system may generate for display, in the user interface of the user device, based on an output of the model, a cyber incident report, wherein the cyber incident report corresponds to the cyber incident log.

Various other aspects, features, and advantages of the invention will be apparent through the detailed description of the invention and the drawings attached hereto. It is also to be understood that both the foregoing general description and the following detailed description are examples, and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1A:
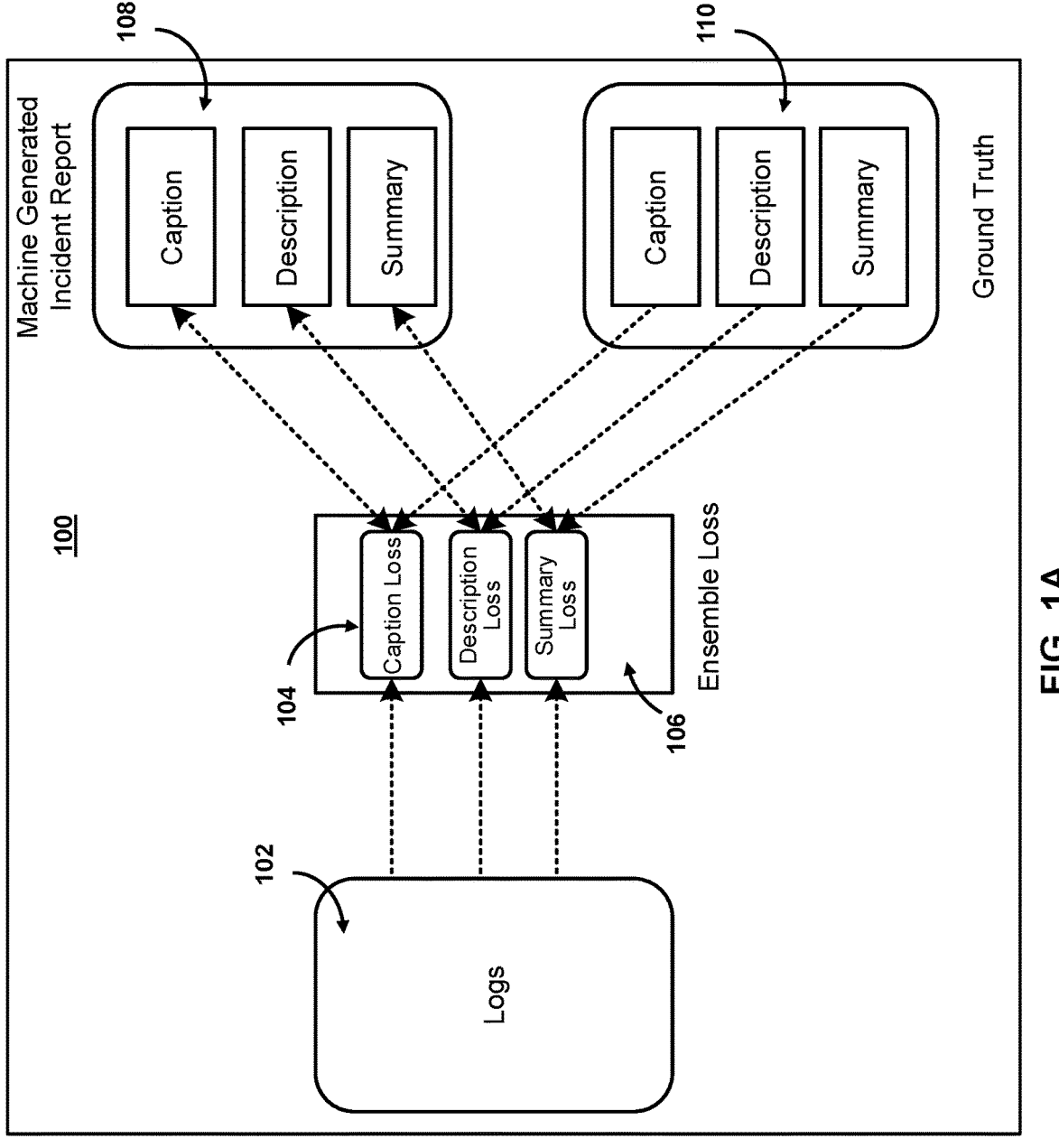
FIGS. 1A-1B show illustrative diagrams for generating incident reports, in accordance with one or more embodiments.
Figure 1B:
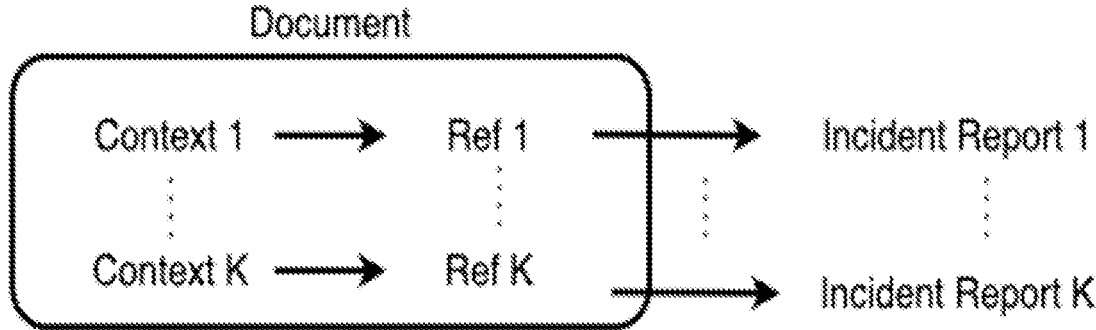
Figure 1B:
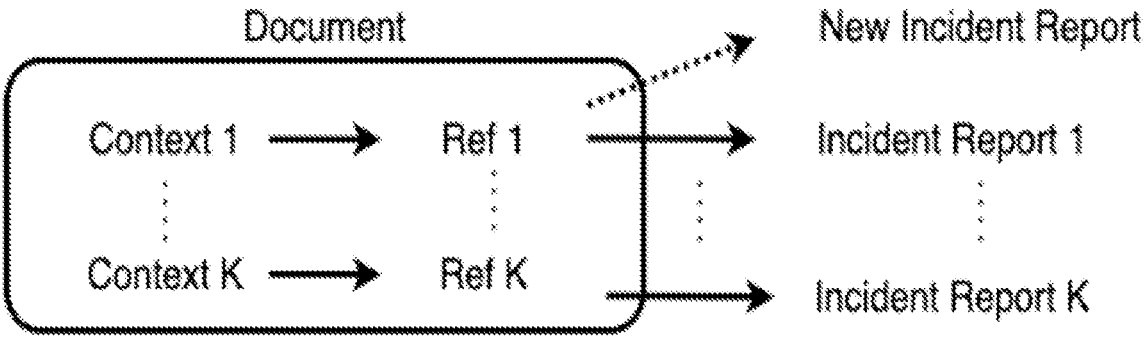

FIGS. 1A-1B show illustrative diagrams for generating incident reports, in accordance with one or more embodiments. For example, FIG. 1A shows log 102, which may be a display on user interface 100 (e.g., of a web browser). Alternatively, log 102 may feature a cyber incident log as it resided in a data source (e.g., a cyber incident log published in its native form by a cyber incident log provider). FIG. 1B shows a diagram detailing the creation of a new cyber incident report in a data source (e.g., a document store). For example, FIG. 1B may comprise a cyber incident report that may appear on a user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "cyber incident log" may refer to a cybersecurity incident log or simply an incident log, which may be a record-keeping mechanism used by organizations to document and track cybersecurity incidents. It serves as a chronological record of notable events related to information security, such as cyberattacks, data breaches, unauthorized access attempts, malware infections, system vulnerabilities, and other security-related incidents. The cyber incident log may be generated automatically by one or more systems. The log may provide a central repository of all recorded incidents, offering a comprehensive view of security events and patterns over time. By examining the log entries, security experts can analyze attack patterns, identify potential vulnerabilities, and investigate the root causes of incidents. Incident response teams can use the log to track their actions, responses, and the effectiveness of their strategies in mitigating the impact of incidents. The log entries typically include information such as the date and time of the incident, the type of incident, a description of what happened, the affected systems or assets, actions taken to address the incident, and the personnel involved in the response. It is essential for the log to be accurate, comprehensive, and securely stored to maintain the integrity and confidentiality of the information.

In contrast, a "cyber incident report" may be a formal document generated by an organization or entity to provide a detailed account of a cybersecurity incident that has occurred. It serves as a record of the incident and its impact, as well as a summary of the response actions taken to mitigate the incident's effects and prevent similar incidents in the future. The report may be prepared by the incident response team, IT security professionals, or other relevant personnel involved in handling the incident. The content of a cyber incident report can vary depending on the organization's internal policies and the nature of the incident. For example, the cyber incident report may comprise a concise description of the incident, including the date and time it was discovered, the type of incident (e.g., data breach, malware infection, DDoS attack), and a summary of the impact on the organization's assets and operations. The cyber incident report may also comprise a chronological sequence of events related to the incident, detailing how the attack or security breach unfolded, from the initial intrusion to containment and resolution. The cyber incident report may also comprise information about the systems, applications, or data that were compromised or affected during the incident, along with the scope and magnitude of the impact. The cyber incident report may also comprise an examination of the underlying causes or vulnerabilities that allowed the incident to occur. This analysis helps identify weaknesses in the organization's security posture that need to be addressed to prevent future incidents. The cyber incident report may also comprise a summary of the actions taken by the incident response team or IT security personnel to contain the incident, mitigate its effects, and restore affected systems and data. The incident report may play a crucial role in maintaining transparency within the organization and demonstrating due diligence in responding to cybersecurity incidents. It also serves as a valuable resource for post-incident analysis and future incident response planning. Additionally, for organizations subject to regulatory requirements, incident reports may be necessary for compliance purposes and may need to be shared with regulatory bodies or law enforcement as appropriate.

FIG. 1A shows log section 104. For example, a cyber incident log has a plurality of log sections. As referred to herein, a "log section" may comprise any of the more or less distinct parts into which the cyber incident log may be divided or from which the cyber incident log is made up. For example, a log section may be distinguished from another log section by one or more log section characteristics. The system may identify a log section of the plurality of log sections that has a log section characteristic.

A log section characteristic may comprise any characteristic that distinguishes one log section from another. For example, a log section characteristic may be media-related information (e.g., ordering, heading information, titles, descriptions, ratings information (e.g., parental control ratings, critics' ratings, etc.), source code data (e.g., HTML, source code headers, etc.), genre or cross-reference information, subject matter information, author/actor information, logo data, or other identifiers for the cyber incident log provider), media format, file type, object type, objects appearing in the cyber incident log (e.g., product placements, advertisements, keywords, context), or any other suitable information used to distinguish one log section from another. In some embodiments, the log section characteristic may also be human-readable text. The log section characteristic may be determined to be indicative of the log section comprising one or more cyber incident characteristics based on a comparison of the log section characteristic and cyber incident profile data for the user.

For example, user interface 100 may include log section 104. The system may identify log section 104 based on a paragraph, a log section break, and/or an HTML tag. The system may parse the log section for a cyber incident characteristic (e.g., cyber incident characteristic) and mapping data, wherein the mapping data describes a relationship of the log section to the plurality of log sections, wherein the mapping data indicates a context of the cyber incident characteristic, and wherein the cyber incident characteristic comprises human-readable text. For example, the system may identify a cyber incident characteristic. As referred to herein, a "cyber incident characteristic" may comprise any of the more or less distinct parts into which the log section may be divided or from which the log section is made up. For example, a cyber incident characteristic may be anything that may distinguish one cyber incident from another. In some embodiments, a cyber incident characteristic may be human-readable text. For example, the cyber incident characteristic may be a keyword, an image, an embedded object, etc. For example, a cyber incident characteristic may refer to specific attributes or traits that are often associated with cybersecurity incidents. These characteristics help cybersecurity professionals, incident responders, and organizations identify, classify, and understand the nature of the incident, which in turn assists in formulating an effective response strategy.

The system may process one or more sections (e.g., log section 104) using one or more loss functions to create a particular section of incident report based on the existing pair of logs and incident reports. Once the incident report is generated, the system may create appropriate references to the existing documents in the knowledge base (e.g., a data source storing cyber incident reports, logs, etc.). The system may use a similarity model to identify the similarity between existing incident reports (e.g., cyber incident report 110) and a machine-generated incident report of the latest log (e.g., cyber incident report 108). The similarity model may check each section of the generated report against the appropriate sections of existing reports. If the similarity is higher than a threshold, which is to be determined by experimentation, the system may identify that the generated incident report is similar to the incident documented in the past. The system may mine the knowledge base (e.g., mine historic cyber incident reports, logs, and/or cyber incident characteristics) to identify all the reports that refer to this incident (earlier identified cyber incidents).

To do so, the system may use a loss function in component 106. As shown in FIG. 1B, the system may extract the context in which the incident is referred and check whether the context also aligns with the machine-generated incident report. For example, the loss function used by component 106 may be a mixed cross entropy loss. The system may use a function:

$$L_{mix} = -\left[ (1 - \alpha_i) \cdot \sum_{t=1}^{n} \log p_\theta \left( y_t | y_{<t}, x \right) + \alpha_i \cdot \sum_{t=1}^{n} \log p_\theta \left( \hat{y}_t | y_{<t}, x \right) \right]$$

$$\text{where } \hat{y}_t = \arg\max_{1 \le k |V|} \log p_\theta \left( w_k | y_{<t}, x \right)^4$$

$$L_{mix} = -\left[ (1 - \alpha_i) \cdot \sum_{t=1}^{n} \log p_\theta \left( y_t | y_{<t}^{mix}, x \right) + \alpha_i \cdot \sum_{t=1}^{n} \log p_\theta \left( \hat{y}_t | y_{<t}^{mix}, x \right) \right].$$

Where $L_{mix}$ is the mixed cross entropy loss given training instances $(x, y)$ where $x$ is log and $y$ is the summary in ground truth. The $y^{mix}$ consists of gold tokens in $y$ and the greedily generated tokens in $\hat{y}$. For example, the translation model may learn from the ground truth in the initial part of the training, and as the training proceeds further, the model learns from the ground truth as well as from its own results. If the context aligns, then the system creates a new reference link to the machine-generated incident report and the existing document in a knowledge base that satisfied the appropriate requirements.

The system may determine a cyber incident log map for a cyber incident log. As referred to herein, a "cyber incident log map" may comprise mapping data that describes the cyber incident log. For example, the log map may be a visual representation, taxonomy, organization, and/or diagram (e.g., used by the system) that outlines the various log sources involved in an incident. The log map may show how different systems, applications, and network devices generate logs and how they are interconnected during an incident. The log map helps incident responders quickly identify critical log sources, understand data flows, and efficiently analyze log data to piece together the incident's timeline and characteristics. Additionally or alternatively, the log map may refer to a documented strategy that maps out the logging practices and configurations for an organization's IT infrastructure. This strategy would detail what events are logged, where logs are stored, how long they are retained, and how they are correlated and analyzed. An incident response team could use this map as a reference to ensure that all relevant logs are captured during an incident investigation. Additionally or alternatively, the log map may be a record or inventory of different log sources deployed across an organization's network and systems. It could include details such as log types, sources, data formats, and collection methods. Such a map would be helpful for identifying gaps in logging coverage and ensuring comprehensive visibility into potential security incidents.

The system may generate a cyber incident log map for the log section based on the mapping data. For example, the cyber incident log map may include each cyber incident characteristic of a given log section with the distances and/or positions indicated. For example, the system may determine a cascading style sheets (CSS) position property for each characteristic. In another example, the system may use hypertext markup language (HTML) absolute positioning to define a cyber incident log map.

As refer to herein, "mapping data" may refer to any data used to generate a cyber incident log. For example, mapping data for a log map may refer to data used, or related to, the process of identifying and documenting the relevant log sources and their associated data that are generated by various systems, applications, and network devices within an organization's IT infrastructure. The goal of mapping data is to create a comprehensive inventory of log sources and understand the type of information each source provides, facilitating effective log analysis during incident investigations.

The mapping data may comprise potential log sources within the organization. These can include firewalls, intrusion detection/prevention systems (IDS/IPS), antivirus solutions, network devices, servers, workstations, applications, and other security and IT infrastructure components. The mapping data may comprise the types of logs generated. Common log types include event logs, access logs, system logs, security logs, audit logs, application logs, and more. Each log type provides specific information about the activities and events occurring on the respective system or device. The mapping data may comprise log formats that can vary significantly depending on the vendor and specific technology used. For each log type, the log format needs to be documented. This information is essential when configuring log collection and analysis tools to process and interpret the log data correctly. The mapping data may comprise logging configuration for each system and device. This includes knowing what events are being logged, the level of detail recorded, and any filtering or suppression settings that may impact the data collected.

The system may then generate a feature input based on the cyber incident log map and the cyber incident characteristic, wherein the feature input comprises a vector array of values indicative of the cyber incident log map and the mapping data. For example, the system may use a model, wherein the model is trained to generate outputs of cyber incident reports, wherein the cyber incident reports correspond to cyber incident log maps and have alternative cyber incident characteristics at predetermined positions. For example, a feature input, also known simply as a feature, may be an individual measurable property or characteristic of the data used to train a model or make predictions. Features are the variables or attributes that represent the input data, and they play a critical role in determining the model's ability to learn patterns and make accurate predictions.

The cyber incident log map may comprise static and/or dynamic data. "Static data" may refer to information that remains constant and unchanging over time. For example, static data may be data that is not expected to be modified or updated frequently, if at all, during the operation of the system. Characteristics of static data may include: constant values (e.g., static data typically consists of constant values that do not change over time or that change very rarely), predefined information (e.g., data that is predefined and often used as reference or lookup data such as country codes, currency codes, product categories, postal codes, and/or other reference data that does not change frequently), and/or read-only access (e.g., meaning it can be retrieved and used for querying or displaying purposes, but it cannot be modified through the application). In some embodiments, static data is not affected by typical transactional operations that modify other parts of the database or system. In some cases, configuration settings for an application may also be considered static data if they are set during the application's setup and do not change during normal operation. Static data is often used to provide context and reference information within an application, cyber incident log, cyber incident report, and/or system.

Dynamic data may refer to information that is subject to change over time. Unlike static data, which remains constant, dynamic data is continually updated, modified, or deleted as new information is generated or existing information is altered. Dynamic data is prevalent in various applications and systems that deal with real-time or transactional information. In many cases, dynamic data is associated with transactional activities, such as online purchases, user interactions on a website, or data generated by IoT devices. Dynamic data often carries a timestamp or time-based information to indicate when the data was last updated. This time sensitivity is crucial for applications that need to track recent changes and display the most up-to-date information. Dynamic data is commonly used in interactive applications where users expect real-time updates and responses. Examples include chat applications, online collaboration tools, and live streaming platforms. Dynamic data is usually stored in databases or other data stores that support frequent read and write operations to accommodate real-time updates. The meaning and relevance of dynamic data may vary based on the context in which it is presented. For example, the stock price of a company may be dynamic data on a financial website but considered static data when analyzing historical trends. Effective management and processing of dynamic data are critical for applications that require real-time responsiveness and up-to-date information.

It often involves optimizing database structures, implementing caching mechanisms, and ensuring efficient data retrieval and update operations to handle the high volume of changes and requests. Additionally, dynamic data is commonly used in data analytics to gain insights from real-time trends and patterns.

FIG. 1B illustrates a process for updating a knowledge base with new references to machine-generated incident reports based on the similarity of reports as well as the context in which they are used. For example, given a machine-generated incident report, the system may identify the nearest neighbor based on the semantic similarity to the existing incident reports. Once the system has the top K incident reports identified similar to the machine-generated incident report, the system may rank the reports based on the context in which the reports are referred inside a knowledge base (e.g., confluence pages, Google Docs documents, etc.). If there is a confidence vote on a similar context in which the incident reports are referred, the system may create new references to the machine-generated incident report to the same documents and context inside the knowledge base.

Figure 2A:
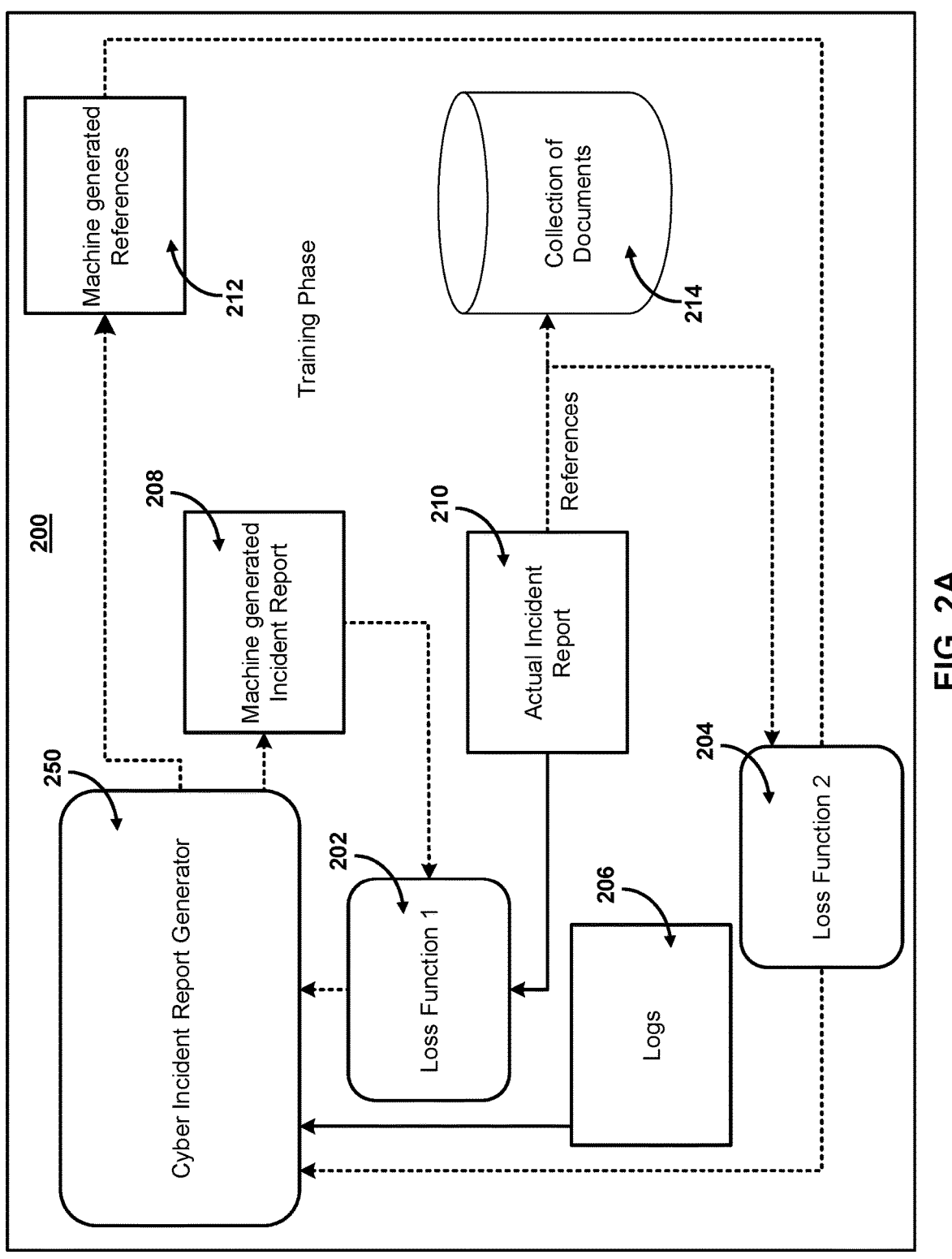
FIGS. 2A-2B show illustrative systems for models for generating incident reports, in accordance with one or more embodiments.
Figure 2B:
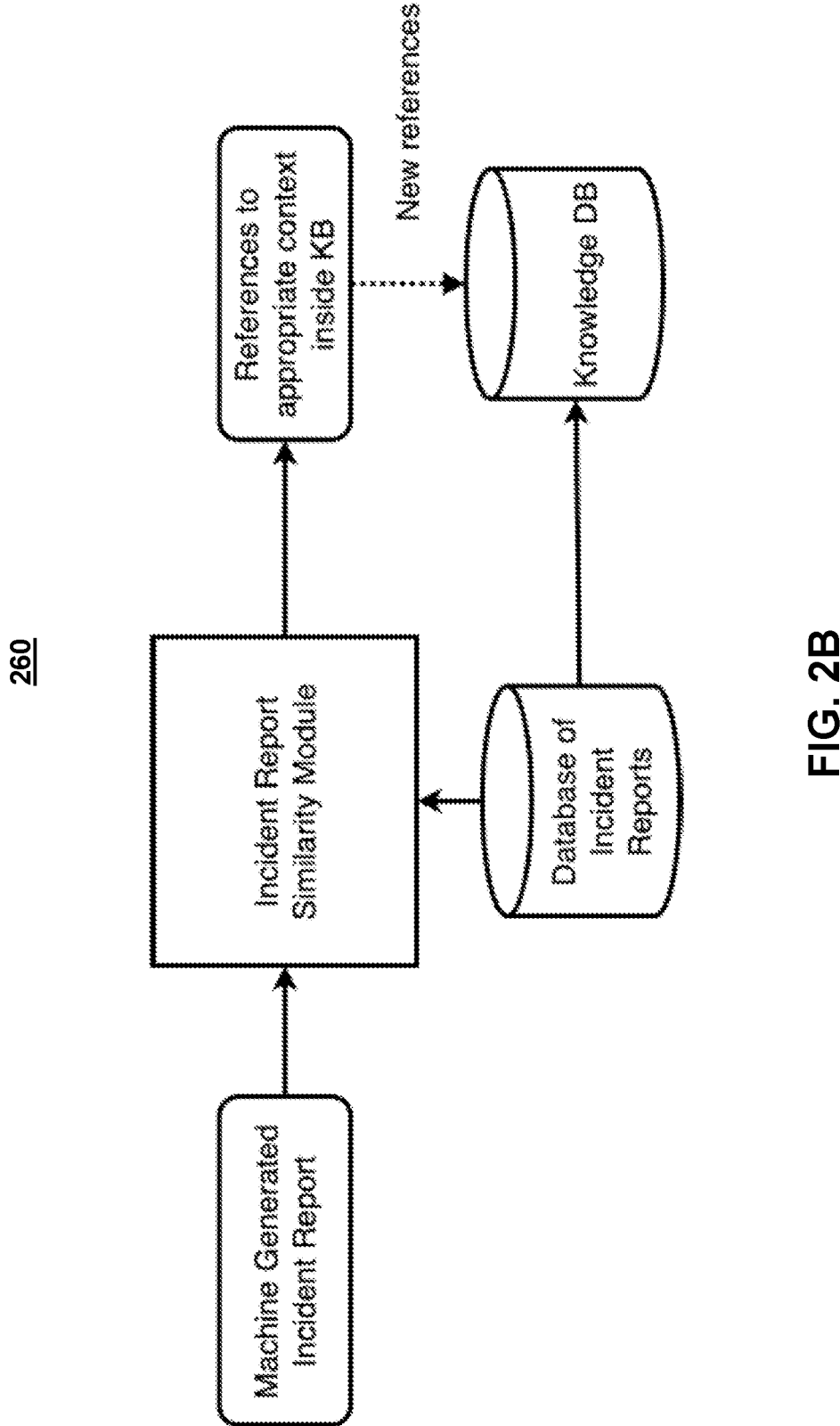

FIGS. 2A-2B show illustrative systems for models for generating incident reports, in accordance with one or more embodiments. FIG. 2A diagrams a high-level block diagram of a cyber incident report generator tool. As shown in FIG. 2A, system 200 includes two decoupled training modules (e.g., model 202 and model 204) for creating the incident report and identifying the documents that refer to similar incident reports. For example, system 200 may receive cyber incident logs from log data source 206. Cyber incident report generator 250 may compare generated incident reports (e.g., report 208) and actual incident reports (e.g., report 210). Cyber incident report generator 250 may also use additional data such as machine-generated references (e.g., from data source 212) and/or a collection of other documents (e.g., from data source 214).

FIG. 2B diagrams a process to create new reference links based on the similarity between machine-generated incident reports and existing incident reports. For example, system 260 may use one or more functions to determine the similarity of incident reports as described in FIG. 1B. Furthermore, the system may update its configurations (e.g., weights, biases, or other parameters) based on the assessment of its prediction and reference feedback information (e.g., user indication of accuracy, reference labels, or other information).

In some embodiments, the system may use an encoder-decoder model. For example, the system may use an encoder-decoder model. The encoder-decoder model may be used with an ensemble of loss functions to learn relationships between the plurality of report sections and the plurality of log sections. For example, in the context of learning relationships between a plurality of report sections and a plurality of log sections, an encoder-decoder model may first receive input data and generate output data. For example, input data may comprise report sections. Each report section may be represented as a sequence of tokens or words. The report sections may be, for example, an incident summary, description, impact analysis, etc. These sections are preprocessed and tokenized to create input sequences.

The output data may comprise log sections. For example, each log section may be represented as a sequence of tokens or words, extracted from various log sources. The log sections can represent different aspects of the incident, such as system logs, application logs, or network logs. These sections are preprocessed and tokenized to create output sequences.

The encoder component takes the input sequence of report sections and processes it to generate a fixed-dimensional representation called the context vector or the encoder state. The encoder typically consists of recurrent neural network (RNN) layers, Long Short-Term Memory (LSTM) units, or Transformer-based models like the Transformer Encoder.

The decoder component takes the context vector generated by the encoder and uses it to produce the output sequence of log sections. The decoder is also built using RNN layers, LSTM units, or Transformer Decoder. It receives the context vector as its initial hidden state and generates log sections one token at a time, conditioning its predictions on the previous tokens generated.

During training, the model is fed pairs of report sections and corresponding log sections. The encoder processes the report section sequence, and the decoder is trained to produce the log section sequence. The model is optimized to minimize the discrepancy between the predicted log sections and the ground truth log sections.

After training, the model can be used for inference. Given a new report section sequence, the encoder generates the context vector, which is then fed into the decoder. The decoder generates log section tokens one by one until an end token or a predefined maximum sequence length is reached.

By using an encoder-decoder model, the system can learn the relationships between report sections and log sections, allowing it to automatically map textual report information to relevant log information. This can be valuable in cybersecurity incident response and analysis, where correlating report details with log data can help identify the root cause and impact of security incidents.

Figure 3:
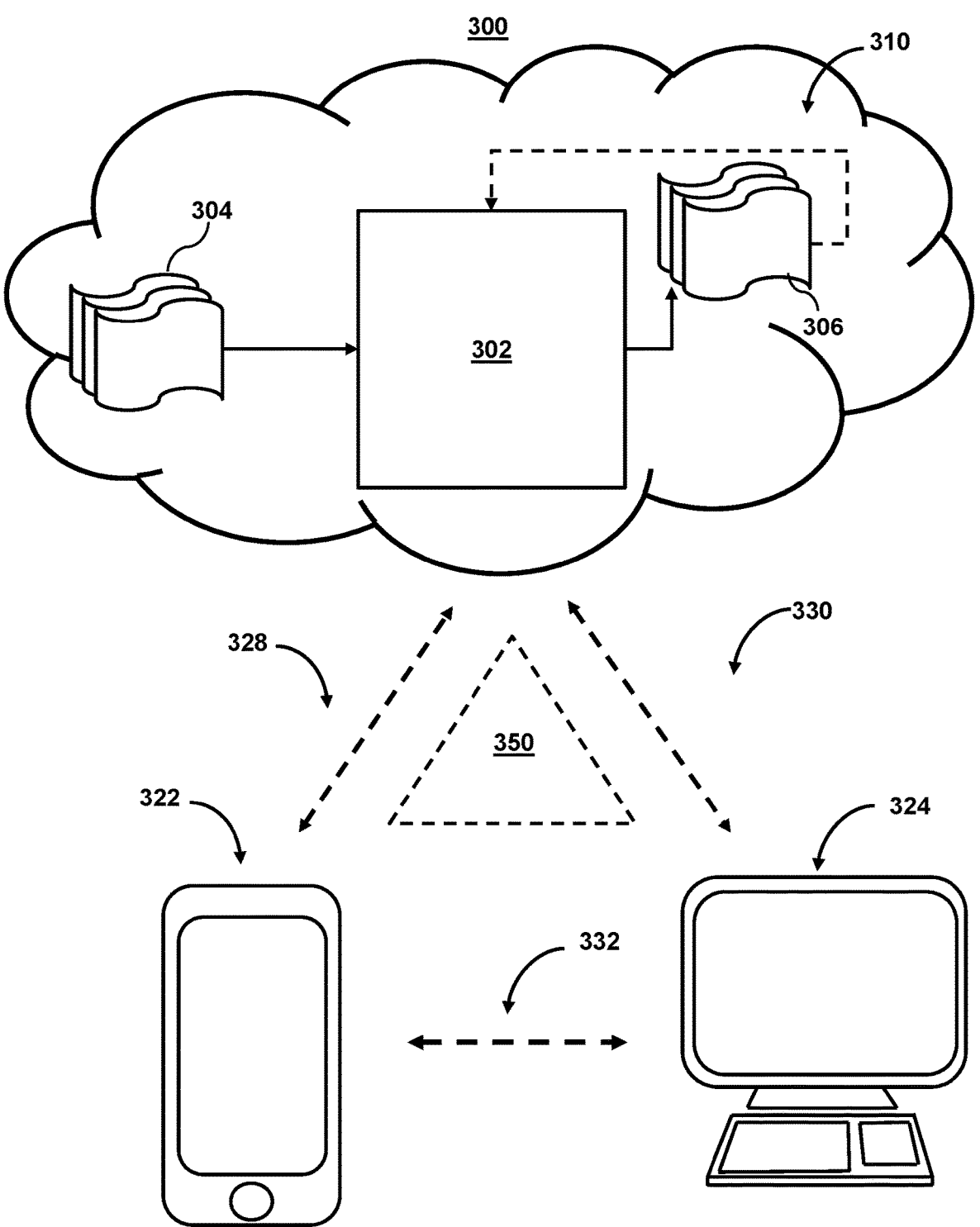
FIG. 3 is an illustrative system for categorizing cyber incident logs featuring dynamic relationships to pre-existing cyber incident reports in real-time, in accordance with one or more embodiments.

FIG. 3 is an illustrative system for categorizing cyber incident logs featuring dynamic relationships to pre-existing cyber incident reports in real-time, in accordance with one or more embodiments. For example, system 300 may represent the components used for generating cyber incident reports based on cyber incident logs, as shown in FIGS. 1A-1B and using a model (as shown in FIGS. 2A-2B). As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive cyber incident logs and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays and may instead receive and display cyber incident logs using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative cyber incident logs.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cyber incident profile. Cloud components 310 may also include control circuitry configured to perform the various operations needed to generate alternative cyber incident logs. For example, the cloud components 310 may include cloud-based storage circuitry configured to generate alternative cyber incident logs. Cloud components 310 may also include cloud-based control circuitry configured to run processes to determine alternative cyber incident logs. Cloud components 310 may also include cloud-based I/O circuitry configured to display alternative cyber incident logs.

Cloud components 310 may include model 302, which may be a machine learning model (e.g., as described in FIGS. 2A-2B). Model 302 may take inputs 304 and provide outputs 306. The inputs may include multiple datasets such as a training dataset and a test dataset. Each of the plurality of datasets (e.g., inputs 304) may include data subsets related to user data, cyber incident logs, log sections, log maps, cyber incident characteristics, and/or cyber incident reports. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known alternative cyber incident log for the first labeled feature input. The system may then train the first machine learning model to classify the first labeled feature input with known incident logs, log sections, log maps, cyber incident characteristics, and/or cyber incident reports.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., alternative cyber incident log).

In some embodiments, model 302 may predict alternative cyber incident logs. For example, the system may determine that particular characteristics are more likely to be indicative of a type of alternative cyber incident log. In some embodiments, the model (e.g., model 302) may automatically perform actions (e.g., generate a cyber incident report, recommendation, etc.) based on output 306. In some embodiments, the model (e.g., model 302) may not perform any actions.

System 300 also includes an application programming interface layer such as API layer 350. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PUP, and JavaScript. SOAP Web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use developer portal. API layer 350 may use strong security constraints applying WAF and DDoS protection, and API layer 350 may use RESTful APIs as standard for external integration.

Figure 4:
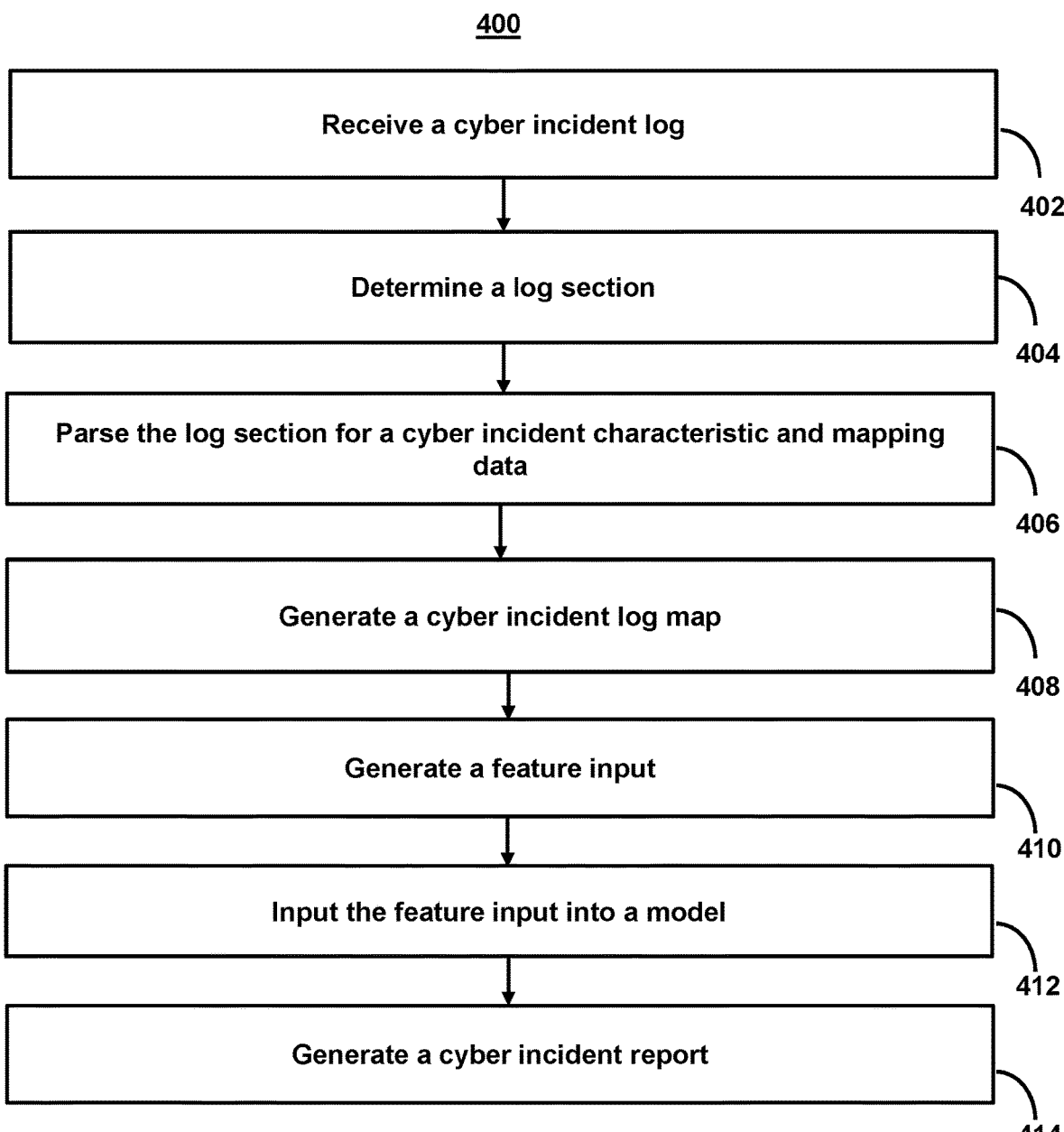
FIG. 4 shows a flowchart of the steps involved in categorizing cyber incident logs featuring dynamic relationships to pre-existing cyber incident reports in real-time, in accordance with one or more embodiments.

FIG. 4 shows a flowchart of the steps involved in categorizing cyber incident logs featuring dynamic relationships to pre-existing cyber incident reports in real-time, in accordance with one or more embodiments. For example, process 400 may represent the steps taken by one or more devices as shown in FIGS. 1A-3.

At step 402, process 400 (e.g., using one or more components in system 300 (FIG. 3)) receives a cyber incident log. For example, the system may receive a cyber incident log, wherein the cyber incident log includes a plurality of log sections.

At step 404, process 400 (e.g., using one or more components in system 300 (FIG. 3)) determines a log section. For example, the system may determine a log section of the plurality of log sections that has a log section characteristic, wherein the log section characteristic is indicative of the log section comprising one or more cyber incident characteristics. In some embodiments, determining the log section of the plurality of log sections that has the log section characteristic may comprise determining a plurality of log section characteristics in the log section and comparing each of the plurality of log section characteristics to cyber incident characteristics in a cyber incident profile to determine a correspondence. For example, the system may search each log section for log section characteristics (e.g., keywords, genre, authors, etc.) that may match preferences in a cyber incident profile. In some embodiments, when replacing a log section, the system may switch specific words, objects, or images, and/or may rewrite the log section.

At step 406, process 400 (e.g., using one or more components in system 300 (FIG. 3)) parses the log section. For example, the system may parse the log section for a cyber incident characteristic and mapping data, wherein the mapping data describes a relationship of the log section to the plurality of log sections. For example, in some embodiments, the cyber incident characteristic may be an alphanumeric text string and the mapping data, wherein the mapping data describes a relationship of the log section to the plurality of log sections that comprises a cross-reference of an object corresponding to the alphanumeric text string. For example, the mapping data may indicate a context of the cyber incident characteristic (e.g., the mapping data may indicate the circumstances that form the setting for an incident, statement, or idea, and in terms of which it can be fully understood and assessed, related to the cyber incident characteristic).

In some embodiments, parsing the log section for the cyber incident characteristic may comprise retrieving a list of cyber incident characteristics, comparing objects in the log section to the list of cyber incident characteristics, and determining the cyber incident characteristic based on matching an object of the objects to a listed cyber incident characteristic. For example, the list of cyber incident characteristics may indicate cyber incident characteristics that may be replaced. The system may search the log section for these cyber incident characteristics.

At step 408, process 400 (e.g., using one or more components in system 300 (FIG. 3)) generates a cyber incident log map. For example, the system may generate a cyber incident log map for the log section based on the mapping data.

At step 410, process 400 (e.g., using one or more components in system 300 (FIG. 3)) generates a feature input. For example, the system may generate a feature input based on the cyber incident log map and the cyber incident characteristic. For example, the system may input the feature input into a model, wherein the model is trained to determine similarities between one or more of a plurality of cyber incident reports and inputted feature inputs. For example, the feature input may comprise a vector array of values indicative of the cyber incident log map and the mapping data.

In some embodiments, the model is trained to determine similarities between one or more of a plurality of cyber incident reports and inputted feature inputs by receiving a plurality of report sections and using an encoder-decoder model with an ensemble of loss functions to learn relationships between the plurality of report sections and the plurality of log sections.

In some embodiments, the system may generate cyber incident reports based on a type of cyber incident log type. For example, the system may determine a cyber incident log type for the cyber incident log. The system may generate the feature input based on the cyber incident log type.

At step 412, process 400 (e.g., using one or more components in system 300 (FIG. 3)) inputs the feature input into a model. For example, the system may input the feature input into a model to generate an output, wherein the model is trained to determine similarities between one or more of a plurality of cyber incident reports and inputted feature inputs. In some embodiments, the cyber incident characteristic may be textual data and the alternative cyber incident characteristic may be different textual data. Alternatively, the cyber incident characteristic may be textual data and the alternative cyber incident characteristic may be image data, wherein the model is trained to translate the textual data into the image data.

At step 414, process 400 (e.g., using one or more components in system 300 (FIG. 3)) generates the cyber incident report. For example, the system may generate for display, in a user interface of a user device of a user, based on the output of the model, a cyber incident report, wherein the cyber incident report corresponds to the cyber incident log. In some embodiments, generating for display, in the user interface of the user device, based on the output of the model, the cyber incident report of the plurality of cyber incident reports may comprise the system determining, based on the output, that the cyber incident report has a threshold similarity to the feature input and linking the cyber incident log to the cyber incident report based on determining that the cyber incident report has the threshold similarity to the feature input. In some embodiments, generating for display, in the user interface of the user device, based on the output of the model, the cyber incident report of the plurality of cyber incident reports may comprise the system determining, using an ensemble of loss functions, a report section corresponding to the log section and generating the cyber incident report based on the report section.

In some embodiments, the cyber incident report may comprise a new cyber incident report. For example, the system may retrieve the plurality of cyber incident reports from a data source and add the cyber incident report to the data source.

In some embodiments, the model is further trained to generate an additional output of an additional cyber incident report, and the additional cyber incident report is simultaneously displayed with the cyber incident report. For example, the system may generate additional cyber incident reports.

In some embodiments, the model may further comprise an autoregressive language model that performs natural language processing using pre-trained language representations. For example, autoregressive language models use deep learning to produce human-like text. For example, the autoregressive model may specify that an output variable depends linearly on its own previous values and on a stochastic term (e.g., an imperfectly predictable term). The model is therefore in the form of a stochastic difference equation (or recurrence relation, which should not be confused with differential equation). Through the use of this model, the system produces alternative text in a log section that is more human-like and preserves a natural tone and/or cadence.

In some embodiments, the system may parse the cyber incident report for the log section characteristic. For example, the system may perform an additional check to ensure that the original log section characteristics that include a detected cyber incident characteristic are still present in the cyber incident report. If not, the system may generate a new cyber incident report. In response to identification of the log section characteristic in the cyber incident report, the cyber incident report is generated for display.

In some embodiments, the system may link a cyber incident log to a plurality of cyber incident reports. For example, the system may determine a citation for the cyber incident report. The system may link the cyber incident log to a subset of the plurality of cyber incident reports based on the citation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1A-3 could be used to perform one of more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for categorizing cyber incident logs featuring dynamic relationships to pre-existing cyber incident reports in real-time.

2. The method of the preceding embodiment, further comprising: receiving a cyber incident log, wherein the cyber incident log includes a plurality of log sections; determining a log section of the plurality of log sections that has a log section characteristic, wherein the log section characteristic is indicative of the log section comprising one or more cyber incident characteristics; parsing the log section for a cyber incident characteristic and mapping data, wherein the mapping data describes a relationship of the log section to the plurality of log sections; generating a cyber incident log map for the log section based on the mapping data; generating a feature input based on the cyber incident log map and the cyber incident characteristic; inputting the feature input into a model to generate an output, wherein the model is trained to determine similarities between one or more of a plurality of cyber incident reports and inputted feature inputs; and generating for display, in a user interface of a user device of a user, based on the output of the model, a cyber incident report, wherein the cyber incident report corresponds to the cyber incident log.

3. The method of any one of the preceding embodiments, further comprising: determining a cyber incident log type for the cyber incident log; and further generating the feature input based on the cyber incident log type.

4. The method of any one of the preceding embodiments, wherein the model is trained to determine similarities between one or more of a plurality of cyber incident reports and inputted feature inputs by: receiving a plurality of report sections; and using an encoder-decoder model with an ensemble of loss functions to learn relationships between the plurality of report sections and the plurality of log sections.

5. The method of any one of the preceding embodiments, further comprising: determining a citation for the cyber incident report; and linking the cyber incident log to a subset of the plurality of cyber incident reports based on the citation.

6. The method of any one of the preceding embodiments, wherein generating for display, in the user interface of the user device, based on the output of the model, the cyber incident report of the plurality of cyber incident reports further comprises: determining, based on the output, that the cyber incident report has a threshold similarity to the feature input; and linking the cyber incident log to the cyber incident report based on determining that the cyber incident report has the threshold similarity to the feature input.

7. The method of any one of the preceding embodiments, wherein generating for display, in the user interface of the user device, based on the output of the model, the cyber incident report of the plurality of cyber incident reports further comprises: determining, using an ensemble of loss functions, a report section corresponding to the log section; and generating the cyber incident report based on the report section.

8. The method of any one of the preceding embodiments, further comprising: retrieving the plurality of cyber incident reports from a data source; and adding the cyber incident report to the data source.

9. The method of any one of the preceding embodiments, wherein determining the log section of the plurality of log sections that has the log section characteristic further comprises: determining a plurality of log section characteristics in the log section; and comparing each of the plurality of log section characteristics to cyber incident characteristics in a cyber incident profile to determine a correspondence.

10. The method of any one of the preceding embodiments, wherein the cyber incident characteristic is textual data, and wherein the cyber incident report comprises an alternative cyber incident characteristic that is different textual data.

11. The method of any one of the preceding embodiments, wherein the cyber incident characteristic is textual data, wherein the cyber incident report comprises an alternative cyber incident characteristic that is image data, and wherein the model is trained to translate the textual data into the image data.

12. The method of any one of the preceding embodiments, wherein the cyber incident characteristic is an alphanumeric text string and the mapping data, and wherein the mapping data describing a relationship of the log section to the plurality of log sections comprises a cross-reference of an object corresponding to the alphanumeric text string.

13. The method of any one of the preceding embodiments, wherein the model is further trained to generate an additional output of an additional cyber incident report, and wherein the additional cyber incident report is simultaneously displayed with the cyber incident report.

14 The method of any one of the preceding embodiments, wherein the model further comprises an autoregressive language model that performs natural language processing using pre-trained language representations.

15. The method of any one of the preceding embodiments, wherein parsing the log section for the cyber incident characteristic further comprises: retrieving a list of cyber incident characteristics; comparing objects in the log section to the list of cyber incident characteristics; and determining the cyber incident characteristic based on matching an object of the objects to a listed cyber incident characteristic.

16. One or more non-transitory, computer-readable media storing instructions that, when executed by a data processing apparatus, cause the data processing apparatus to perform operations comprising those of any of embodiments 1-15.

17. A system comprising: one or more processors; and memory storing instructions that, when executed by the processors, cause the processors to effectuate operations comprising those of any of embodiments 1-15.

18. A system comprising means for performing any of embodiments 1-15.

What is claimed is:

1. A system for categorizing cyber incident logs featuring dynamic relationships to pre-existing cyber incident reports in real-time, the system comprising:

one or more processors; and one or more non-transitory, computer-readable media comprising instructions that, when executed by the one or more processors, cause operations comprising:

receiving a cyber incident log, wherein the cyber incident log relates to a recorded cyber incident, and wherein the cyber incident log includes a plurality of log sections;

determining a log section of the plurality of log sections that has a log section characteristic, wherein the log section characteristic is indicative of the log section comprising one or more cyber incident characteristics;

parsing the log section for a cyber incident characteristic and mapping data, wherein the mapping data describes a relationship of the log section to the plurality of log sections;

generating a cyber incident log map for the log section based on the mapping data;

generating a feature input based on the cyber incident log map and the cyber incident characteristic;

inputting the feature input into a first model, wherein the first model is trained to determine similarities between one or more of a plurality of historic cyber incident reports and inputted feature inputs;

determining, based on a first output of the first model, a cyber incident report type corresponding to the cyber incident log;

inputting the feature input and the cyber incident report type into a second model, wherein the second model is trained to generate cyber incident reports based on cyber incident report types;

determining, based on a second output of the second model, a cyber incident report; and adding the cyber incident report to a plurality of cyber incident reports stored at a data source.

2. A method for categorizing cyber incident logs featuring dynamic relationships to pre-existing cyber incident reports in real-time, the method comprising:

receiving a cyber incident log, wherein the cyber incident log includes a plurality of log sections;

determining a log section of the plurality of log sections that has a log section characteristic, wherein the log section characteristic is indicative of the log section comprising one or more cyber incident characteristics;

parsing the log section for a cyber incident characteristic and mapping data, wherein the mapping data describes a relationship of the log section to the plurality of log sections;

generating a cyber incident log map for the log section based on the mapping data;

generating a feature input based on the cyber incident log map and the cyber incident characteristic;

inputting the feature input into a model to generate an output, wherein the model is trained to determine similarities between one or more of a plurality of cyber incident reports and inputted feature inputs; and generating for display, in a user interface of a user device of a user, based on the output of the model, a cyber incident report, wherein the cyber incident report corresponds to the cyber incident log.

3. The method of claim 2, further comprising:

determining a cyber incident log type for the cyber incident log; and further generating the feature input based on the cyber incident log type.

4. The method of claim 2, wherein the model is trained to determine similarities between one or more of a plurality of cyber incident reports and inputted feature inputs by:

receiving a plurality of report sections; and using an encoder-decoder model with an ensemble of loss functions to learn relationships between the plurality of report sections and the plurality of log sections.

5. The method of claim 2, further comprising:

determining a citation for the cyber incident report; and linking the cyber incident log to a subset of the plurality of cyber incident reports based on the citation.

6. The method of claim 2, wherein generating for display, in the user interface of the user device, based on the output of the model, the cyber incident report of a plurality of cyber incident reports further comprises:

determining, based on the output, that the cyber incident report has a threshold similarity to the feature input; and linking the cyber incident log to the cyber incident report based on determining that the cyber incident report has the threshold similarity to the feature input.

7. The method of claim 2, wherein generating for display, in the user interface of the user device, based on the output of the model, the cyber incident report of a plurality of cyber incident reports further comprises:

determining, using an ensemble of loss functions, a report section corresponding to the log section; and generating the cyber incident report based on the report section.

8. The method of claim 2, further comprising:

retrieving the plurality of cyber incident reports from a data source; and adding the cyber incident report to the data source.

9. The method of claim 2, wherein determining the log section of the plurality of log sections that has the log section characteristic further comprises:

determining a plurality of log section characteristics in the log section; and comparing each of the plurality of log section characteristics to cyber incident characteristics in a cyber incident profile to determine a correspondence.

10. The method of claim 2, wherein the cyber incident characteristic is textual data, and wherein the cyber incident report comprises an alternative cyber incident characteristic that is different textual data.

11. The method of claim 2, wherein the cyber incident characteristic is textual data, wherein the cyber incident report comprises an alternative cyber incident characteristic that is image data, and wherein the model is trained to translate the textual data into the image data.

12. The method of claim 2, wherein the cyber incident characteristic is an alphanumeric text string and the mapping data, and wherein the mapping data describing a relationship of the log section to the plurality of log sections comprises a cross-reference of an object corresponding to the alphanumeric text string.

13. The method of claim 2, wherein the model is further trained to generate an additional output of an additional cyber incident report, and wherein the additional cyber incident report is simultaneously displayed with the cyber incident report.

14. The method of claim 2, wherein the model further comprises an autoregressive language model that performs natural language processing using pre-trained language representations.

15. The method of claim 2, wherein parsing the log section for the cyber incident characteristic further comprises:

retrieving a list of cyber incident characteristics;

comparing objects in the log section to the list of cyber incident characteristics; and determining the cyber incident characteristic based on matching an object of the objects to a listed cyber incident characteristic.

16. One or more non-transitory, computer-readable media comprising instructions that, when executed by one or more processors, cause operations comprising:

receiving a cyber incident log, wherein the cyber incident log includes a plurality of log sections;

determining a log section of the plurality of log sections that has a log section characteristic, wherein the log section characteristic is indicative of the log section comprising one or more cyber incident characteristics;

parsing the log section for a cyber incident characteristic and mapping data, wherein the mapping data describes a relationship of the log section to the plurality of log sections;

generating a cyber incident log map for the log section based on the mapping data;

inputting the cyber incident log map and the cyber incident characteristic into a model to generate an output, wherein the model is trained to determine similarities between one or more of a plurality of cyber incident reports and inputted feature inputs; and generating, based on the output, a cyber incident report, wherein the cyber incident report corresponds to the cyber incident log.

17. The one or more non-transitory, computer-readable media of claim 16, further comprising:

determining a cyber incident log type for the cyber incident log; and further generating the feature inputs based on the cyber incident log type.

18. The one or more non-transitory, computer-readable media of claim 16, wherein the model is trained to determine similarities between one or more of a plurality of cyber incident reports and inputted feature inputs by:

receiving a plurality of report sections; and using an encoder-decoder model with an ensemble of loss functions to learn relationships between the plurality of report sections and the plurality of log sections.

19. The one or more non-transitory, computer-readable media of claim 16, further comprising:

determining a citation for the cyber incident report; and linking the cyber incident log to a subset of the plurality of cyber incident reports based on the citation.

20. The one or more non-transitory, computer-readable media of claim 16, wherein generating, based on the output of the model, the cyber incident report of a plurality of cyber incident reports further comprises:

determining, based on the output, that the cyber incident report has a threshold similarity to the feature inputs; and linking the cyber incident log to the cyber incident report based on determining that the cyber incident report has the threshold similarity to the feature inputs.

\* \* \* \* \*